United States Patent (10) Patent No.: US 7,044,537 B2
Schoemann et al. (45) Date of Patent: May 16, 2006

(54) AIR DUCT ASSEMBLY

(75) Inventors: Michael P. Schoemann, Waterford, MI (US); John D. Youngs, Southgate, MI (US); Glenn A. Cowelchuk, Chesterfield Township, MI (US); Randy S. Reed, Fair Haven, MI (US)

(73) Assignee: Lear Corporation, Southfield, MI (US)

( * ) Notice: Subject to any disclaimer, the term of this patent is extended or adjusted under 35 U.S.C. 154(b) by 80 days.

(21) Appl. No.: 10/822,587

(22) Filed: Apr. 12, 2004

(65) Prior Publication Data

US 2005/0225121 A1 Oct. 13, 2005

(51) Int. Cl.
*B60R 13/06* (2006.01)

(52) U.S. Cl. .............. 296/208; 296/146.1; 296/146.7; 296/190.09; 277/637

(58) Field of Classification Search .............. 296/208, 296/146.7, 70, 190.09, 152, 146.1, 146.9; 138/109, 155; 277/594, 598, 637, 644; 454/124, 454/127, 143
See application file for complete search history.

(56) References Cited

U.S. PATENT DOCUMENTS

| | | | |
|---|---|---|---|
| 4,111,234 A * | 9/1978 | Wells et al. ................... 138/99 |
| 4,173,174 A * | 11/1979 | Vinko et al. ................. 454/152 |
| 4,243,362 A | 1/1981 | Rees et al. |
| 4,444,711 A | 4/1984 | Schad |
| 4,903,581 A * | 2/1990 | Nilsson ....................... 454/124 |
| 5,251,943 A | 10/1993 | Dalbo et al. |
| 5,685,598 A * | 11/1997 | Inoue et al. ................... 296/72 |
| 5,853,030 A * | 12/1998 | Walding ....................... 138/99 |
| 6,062,635 A * | 5/2000 | Learman et al. ............ 296/208 |
| 6,071,591 A * | 6/2000 | Dausch ....................... 428/132 |
| 6,135,543 A * | 10/2000 | Esposito et al. ............ 296/208 |
| 6,146,565 A | 11/2000 | Keller |
| 6,217,098 B1 * | 4/2001 | O'Brien et al. ............... 296/70 |
| 6,309,012 B1 * | 10/2001 | Fryk et al. ................... 296/211 |
| 6,315,354 B1 | 11/2001 | Tani et al. |
| 6,503,075 B1 | 1/2003 | Schad et al. |
| 6,601,902 B1 * | 8/2003 | Rahmstorf et al. ........... 296/70 |
| 6,679,686 B1 | 1/2004 | Wang |
| 6,863,340 B1 * | 3/2005 | Kawahigashi ............... 296/208 |
| 6,899,381 B1 * | 5/2005 | Fero et al. ................... 296/214 |
| 2002/0145236 A1 | 10/2002 | Wandyez |
| 2002/0195844 A1 | 12/2002 | Hipwell |
| 2003/0096129 A1 | 5/2003 | Kojima |
| 2003/0201571 A1 | 10/2003 | Davis, Jr. et al. |

* cited by examiner

*Primary Examiner*—D. Glenn Dayoan
*Assistant Examiner*—Greg Blankenship
(74) *Attorney, Agent, or Firm*—Brooks Kushman P.C.

(57) ABSTRACT

A duct assembly for a vehicle. The duct assembly includes a trim panel and an air duct. A seal having multiple seal portions is disposed on the air duct to inhibit air leakage. The seal portions are integrally connected and formed from a common material.

19 Claims, 3 Drawing Sheets

AIR DUCT ASSEMBLY

BACKGROUND OF THE INVENTION

1. Field of the Invention

The present invention relates to an air duct assembly for a vehicle, and more particularly to an air duct assembly that includes an integrally formed seal.

2. Background Art

Air ducts are used to distribute air in vehicle air handling systems. These air ducts generally have a tubular configuration and are fastened to other vehicle components, such as an instrument panel. Such ducts are labor-intensive to assemble and occupy a significant amount of space. Air ducts have also been integrated with vehicle headliners to define an air passage, such as that described in U.S. Pat. No. 6,062,635. These headliner ducts do not address the need for seals to connect components, inhibit air leakage, and prevent undesirable noises like whistles. Moreover, these ducts do not address the labor and manufacturing costs associated with making, handling, and installing multiple individual duct seals.

SUMMARY OF THE INVENTION

According to one aspect of the present invention, a duct assembly for use with a motor vehicle having a mounting surface is provided. The duct assembly includes an air duct and first and second seals. The air duct includes an inlet opening for receiving pressurized air and a duct portion for channeling pressurized air. The first seal is disposed on the air duct proximate the inlet opening for inhibiting air leakage at the inlet opening. The second seal is disposed on the air duct proximate the duct portion to inhibit air leakage from the duct portion. The second seal is also configured to be disposed between the air duct and the mounting surface when the duct assembly is mounted on the mounting surface. The first and second seals are integrally connected and simultaneously formed from a common material.

The air duct may include an outlet opening that receives pressurized air from the duct portion. A third seal may be disposed proximate the outlet opening to inhibit air leakage at the outlet opening. The third seal may be integrally connected to and formed with the first and second seals. The first and third seals may have a similar configuration and may be connected by the second seal.

The air duct may include a mating surface configured to engage the mounting surface. The first seal and/or second seal may be disposed on the mating surface. The mating surface may also include a groove that receives the second seal.

According to another aspect of the invention, a duct assembly for a vehicle door is provided. The duct assembly includes an interior trim panel, an air duct, and a set of interconnected seals that are formed from a common material. The interior trim panel includes inlet and outlet apertures and first and second surfaces. The first surface is configured to face toward the interior of the vehicle and the second surface is disposed opposite the first surface. The air duct is attached to the second surface and is configured to channel pressurized air between the inlet and outlet apertures. The set of interconnected seals is disposed on the air duct to inhibit air leakage.

The set of interconnected seals may include a strip seal and an inlet seal. The inlet seal may be configured to extend through the inlet aperture and seal against a source of pressurized air when the door is in a closed position. The inlet seal may extend through an inlet opening to secure the inlet seal to the air duct.

The set of interconnected seals may also include an outlet seal. The outlet seal may be configured to extend through the outlet aperture and engage a second air duct when the door is in the closed position. The outlet seal may extend through an outlet opening to secure the outlet seal to the air duct.

The strip seal may be located between inner and outer edges of the air duct. The air duct may be attached to the second surface along a portion of the air duct located between the strip seal and the outer edge.

According to another aspect of the invention, a duct assembly for a vehicle is provided. The duct assembly includes a trim panel and an air duct. The trim panel includes a first surface configured to face toward the interior of the vehicle, a second surface disposed opposite the first surface, and inlet and outlet apertures that extend through the first and second surfaces. The air duct includes a duct portion, a mating surface, and a seal. The duct portion is configured to channel pressurized air between the inlet and outlet apertures. The mating surface is disposed adjacent to the duct portion and includes an inlet opening. The seal has a strip seal portion disposed on the mating surface to inhibit air leakage and an inlet seal portion extending coaxially with the inlet aperture. The first surface and the air duct cooperate to define a passage for channeling air.

The inlet and outlet apertures may be in different planes. The air duct may also include a outlet opening and the seal may include an outlet seal portion extending coaxially with the outlet opening. A first portion of the inlet seal extending from the mating surface may be thicker than a second portion extending opposite the mating surface.

DETAILED DESCRIPTION OF THE PREFERRED EMBODIMENT(S)

Figure 1:
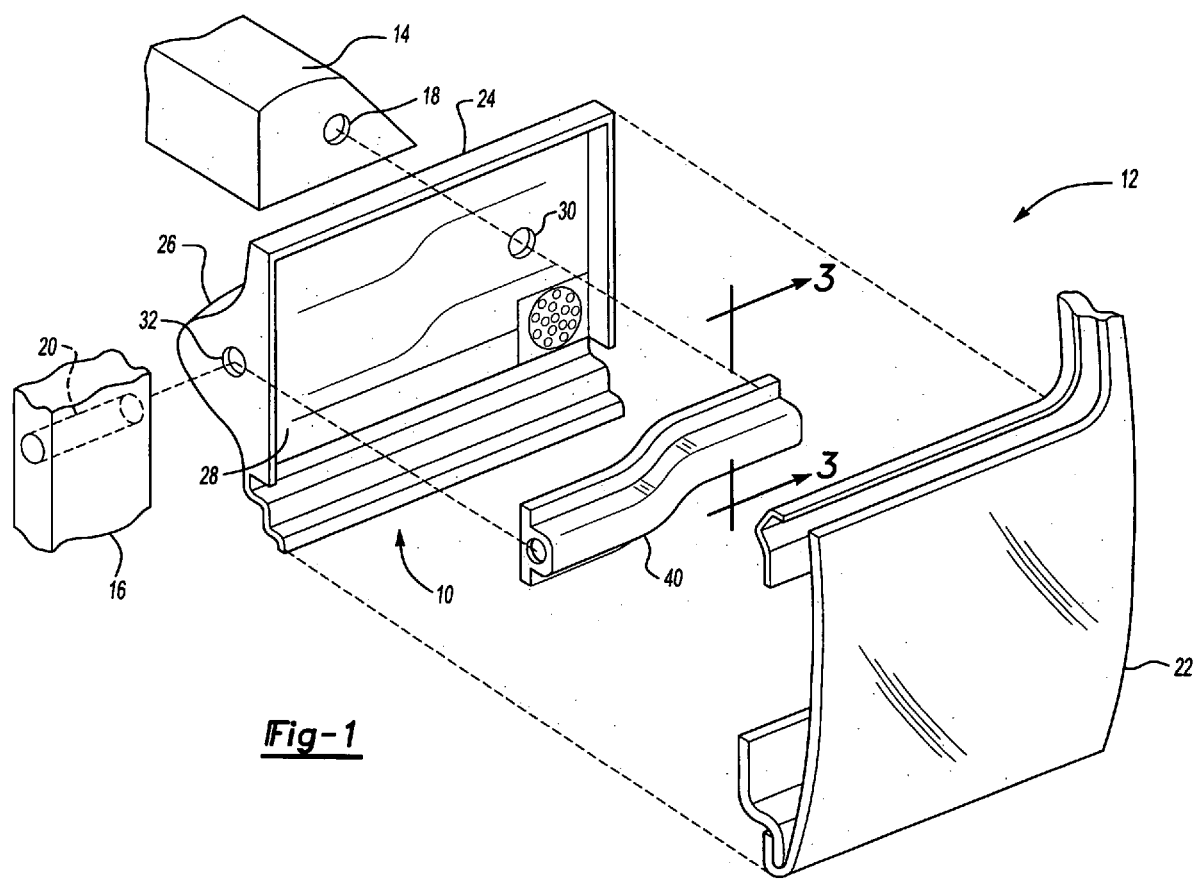
FIG. 1 is an exploded perspective view of an air duct assembly incorporated in a vehicle door.

Referring to FIG. 1, a duct assembly 10 for a vehicle is shown. In this embodiment, the duct assembly 10 is incorporated with a vehicle door 12. However, the duct assembly 10 may be incorporated with any suitable vehicle trim component, such as a hatchback, headliner, console, or instrument panel.

The vehicle door 12 is positioned near an instrument panel 14 and a structural support 16. More specifically, the vehicle door 12 is configured to be adjacent to the instrument panel 14 and structural support 16 when the vehicle door 12 is in a closed position. The instrument panel 14 may include a supply duct 18 that provides pressurized air from a vehicle HVAC (heating, ventilating, and air-conditioning) system (not shown). The structural support 16 may include an exhaust duct 20 that routes pressurized air to one or more vent registers (not shown).

The vehicle door 12 includes an outer panel 22 and an inner panel 24. The outer panel 22 may form an exterior surface of the vehicle. The outer panel 22 may have any suitable configuration and be made of any suitable material, such as fiberglass, a polymeric material, or a metal like steel or aluminum.

The inner panel 24 is configured to face toward the interior of the vehicle. More specifically, the inner panel 24 includes a first surface 26 configured to face toward the interior of the vehicle and a second surface 28 disposed opposite the first surface 26. The inner panel 24 may include various features and trim surfaces, such as an arm rest, controls for locks and windows, speaker openings, and storage bins. The inner panel 24 may be made of any suitable material, such as a polymeric material like polypropylene, and may be attached to the outer panel 22.

In the embodiment shown, the inner panel 24 includes a first aperture 30 and a second aperture 32. The first aperture 30 is configured to align with the supply duct 18 when the vehicle door 12 is closed. Similarly, the second aperture 32 is configured to align with the exhaust duct 20 when the vehicle door 12 is closed.

An air duct 40 is disposed between the outer and inner panels 22,24. In the embodiment shown, the air duct 40 cooperates with the inner panel 22 to define an air passage that routes air from the supply duct 18 to the exhaust duct 20. The air duct 40 may be made of any suitable material, such as a polymeric material like polypropylene.

Figure 2:
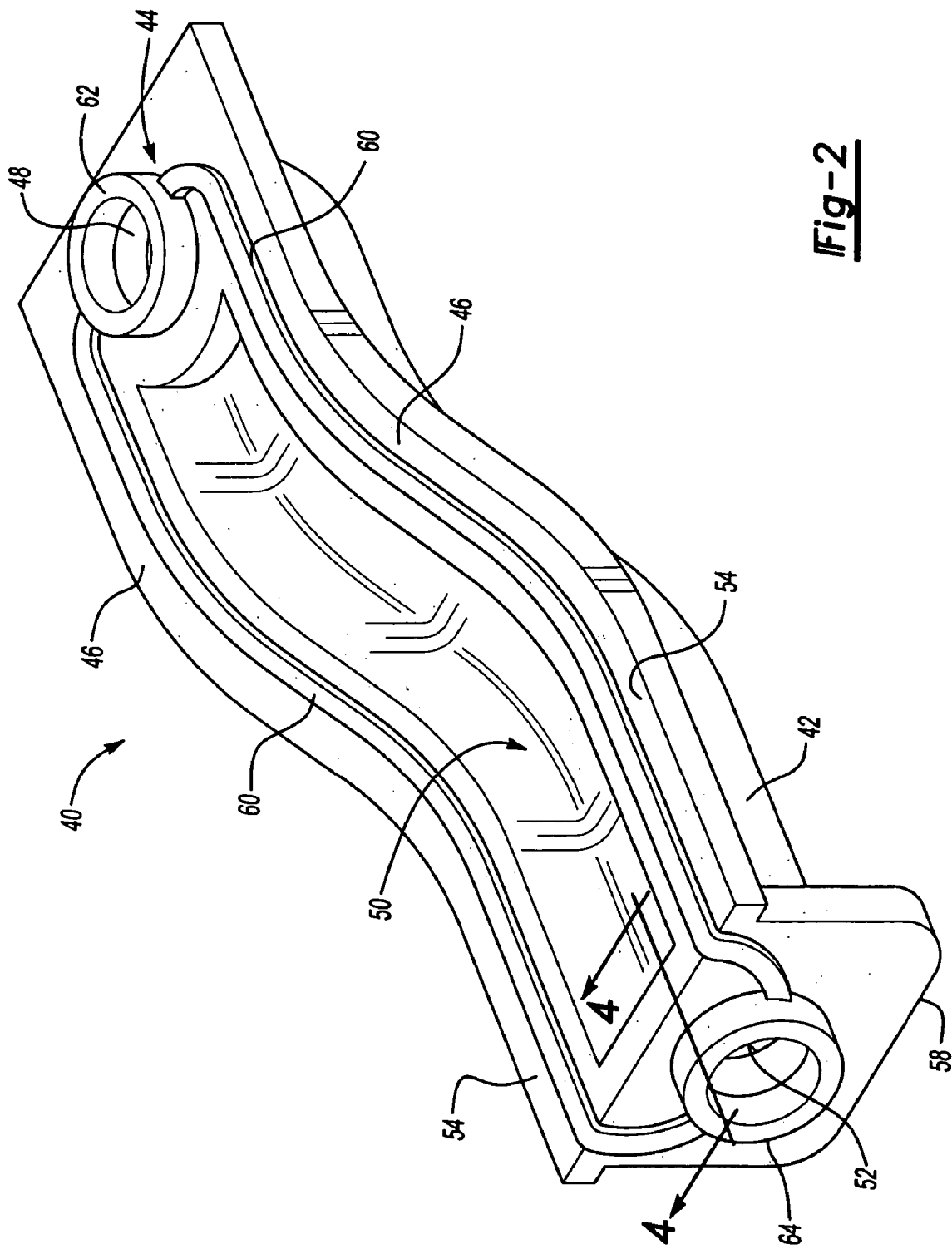
FIG. 2 is a perspective view of an air duct.

Referring to FIG. 2, the air duct 40 is shown in more detail. The air duct 40 includes a body portion 42 and a seal portion 44. The body portion 42 may be made of any suitable material, such as a polymeric material like polypropylene. The body portion 42 includes a flange 46, an inlet opening 48, and a duct portion 50. Optionally, the air duct 40 may also include an outlet opening 52.

The flange 46 is located adjacent to the duct portion 50 and is adapted to be attached to another component, such as the inner panel 24. The flange 46 includes a mating surface 54 and may include one or more grooves 56 adapted to receive the seal portion 44. Optionally, the flange 46 may include one or more protuberances disposed on the mating surface 54 that facilitate attachment to the inner panel 24 by vibration or sonic welding.

The inlet opening 48 may be disposed in a portion of the flange 46 and may be positioned co-axially with the supply duct 18 and/or first aperture 30. Similarly, the outlet opening 52 may be positioned co-axially with the exhaust duct 20 and/or second aperture 32. The inlet opening 48 and outlet opening 52 may be disposed in the same or different surfaces. In the embodiment shown, the inlet opening 48 is disposed along the mating surface 54 and outlet opening 52 is disposed along an end surface 58.

The duct portion 50 may have any suitable configuration that permits an adequate volume of air flow. In the embodiment shown in FIG. 2, the duct portion 50 has a semi-circular cross-section. However, the duct portion 50 may have any suitable cross section or combination of cross section configurations. In addition, multiple conduit branches may be incorporated. For example, a first conduit branch may be used to route air to a window demister vent and a second conduit branch may be used to route air to the exhaust duct or a vent register. Optionally, an individual conduit may be divided into multiple chambers.

The seal 44 is adapted to prevent air leakage. In the embodiment shown, the seal 44 includes a strip seal portion 60, an inlet seal portion 62, and an outlet seal portion 64. Optionally, the outlet seal 64 may be omitted if the air duct 40 does not include an outlet opening 52. The portions 60,62,64 of the seal 44 may be integrally and simultaneously formed. In the embodiment shown, the seal portions 60,62, 64 are interconnected.

The inlet and outlet seals 62,64 are disposed adjacent to the inlet opening 48 and outlet opening 52, respectively. In addition, the inlet and outlet seals 62,64 may extend through the first and second apertures 30,32 and may help secure the air duct 40 to the inner panel 24.

The seal 44 may be made of any material compatible with the physical and chemical properties of the air duct 40. For example, the seal 44 may be made of TPE (thermoplastic elastomer), TPO (thermoplastic olefin), TEEE (thermoplastic elastomer-ether-ester), or an elastomeric compound such as EPDM (ethylene propylene diene terpolymer).

Figure 3:
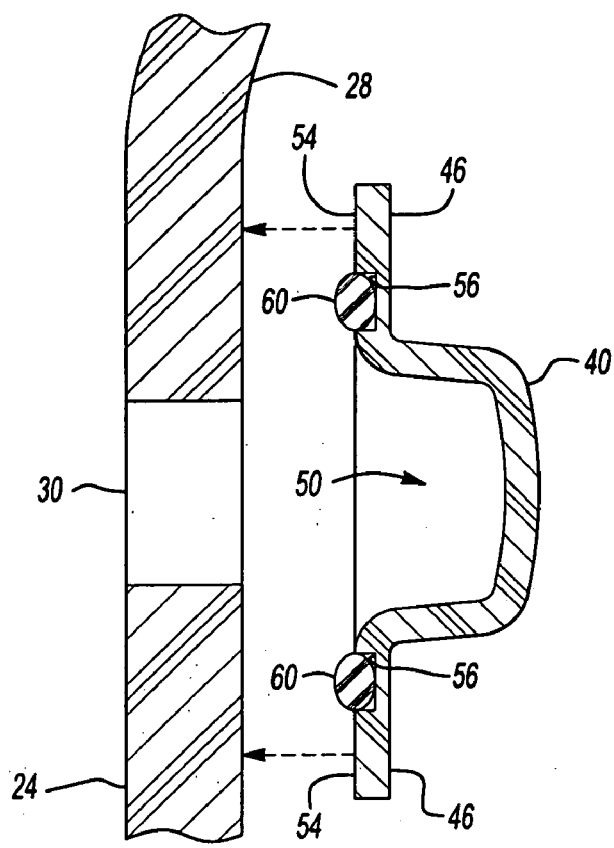
FIG. 3 is a section view of the air duct along section 3—3 in FIG. 1.

Referring to FIGS. 2 and 3, the duct assembly 10 and the strip seal portion 60 are shown in more detail. The strip seal 60 is disposed on the flange 46 and extends along opposite sides of the duct portion 50. The strip seal 60 may be biased toward the duct portion 50 to provide additional surface area between the strip seal 60 and the perimeter of the flange 46 for attaching the air duct 40 to the inner panel 24. Optionally, the strip seal 60 may be disposed in the groove 56 on the mating surface 54. Attachment may be accomplished in any suitable manner, such as by heat staking, sonic welding, vibration welding, adhesives, fasteners, or retaining tabs.

The strip seal 60 may have any suitable configuration. For example, the strip seal 60 may be beaded, ribbed, elliptical, or include a mixture of these and other geometries. In the embodiment shown in FIGS. 2 and 3, the strip seal 60 has a semi-circular cross-section and a relatively constant width and height. For example, the strip seal 60 may have a width of 0.5 to 10 mm and a height of 0.5 to 10 mm.

Figure 4:
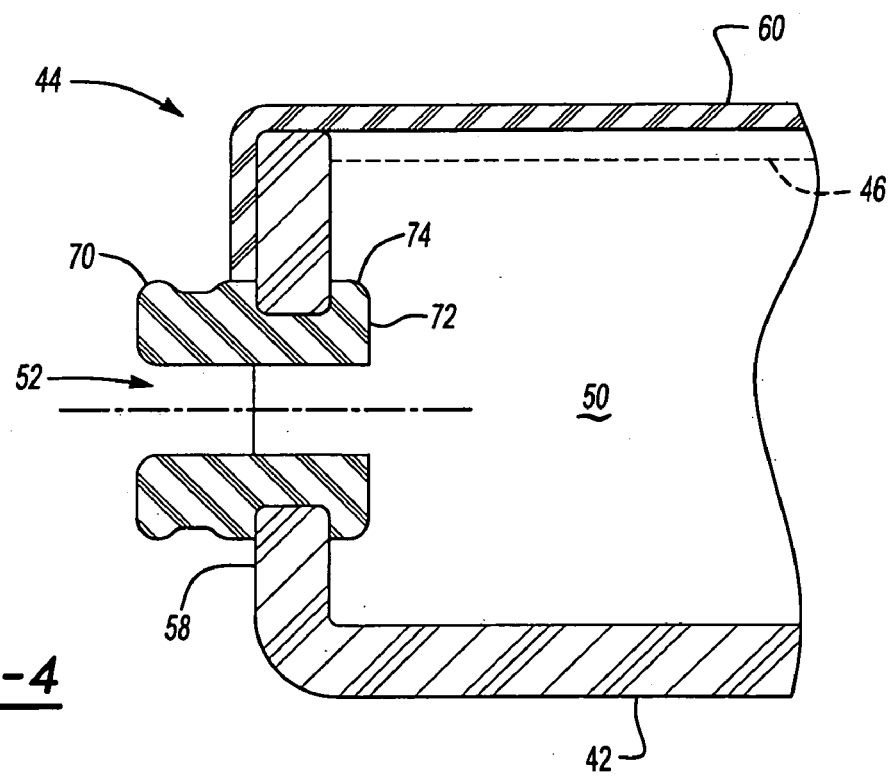
FIG. 4 is section view of the air duct along section 4—4 in FIG. 2.

Referring to FIGS. 2 and 4, the duct assembly 10 and the outlet seal portion 64 are shown in more detail. Although the outlet seal portion 64 is shown, the following description is equally applicable to the inlet seal portion 62 and its 15 relationship to the first aperture 30, inlet opening 48, and the supply duct 18. The inlet and outlet seals 62,64 may have similar or different configurations.

The outlet seal 64 may be disposed adjacent to and co-axially with the outlet opening 52. The outlet seal 64 includes an outer portion 70 and an inner portion 72.

The outer portion 70 is configured to contact and seal against another surface or component, such as the exhaust duct 20. The outer portion 70 may have any suitable configuration, such as a bellows-shaped cross-section, and may include beads or ribs to facilitate sealing. In the embodiment shown, the outlet seal 64 has a generally cylindrical shape.

The inner portion 72 is configured to be disposed in or extend through the outlet opening 52. The inner portion 72 may include a lip 74 that helps secure the outlet seal 64 to the body 42.

The outer portion 70 may have a greater thickness than the inner portion 72 so that it may extend through the second aperture 32 and provide better sealing. More specifically, a thick outer portion 70 provides more material that can be compressed to form an air tight seal and account for gaps between the end of the outlet seal 64 and a mating component.

A method of forming the air duct 24 using a multi-shot or two-shot injection molding process will now be described. Such a process is generally described in U.S. patent application Ser. No. 10/131,015, assigned to Lear Corporation, and is incorporated by reference herein in its entirety.

In a two-shot injection molding process, a first type of material is injected into an injection molding mold to form the body 42 of the air duct 40. After the body is formed, a second type of material is injected into the injection molding mold to form the seal. The mold may include one or more cams or slides that are actuated to create relief cavities into which the second material flows. Alternatively, different mold cavities may be employed for the first and second shots. For instance, a portion of the mold having the material from the first shot may be indexed to a second position and mated to another mold portion having appropriate relief cavities before injecting the second type of material.

The process may include the following steps. First, a two-shot injection mold is provided. Second, a first type of material is injected into the mold via runners to form the body. Third, a cam is actuated or the mold is indexed to create one or more relief cavities in the mold for the seal. Fourth, a second type of material is injected into the mold to form the seal. Optionally, multiple runners may be used to form the strip seal 60, inlet seal 62 and outlet seal 64. The assembly is removed from the mold and may be attached to the inner panel or another suitable interior trim component. For example, the air duct may be attached by sonic welding, vibration welding, heat staking, fasteners, retention tabs, or an adhesive.

The multi-shot or two-shot molding process permits the seal to be integrally formed with the body. Integral formation eliminates the expenses associated with purchasing, maintaining, and operating separate production lines for the body and seal. In addition, improper attachment of the seal to the body is avoided since attachment steps are eliminated. Furthermore, the quality of the molded seal is improved because possible gaps due to tolerance accumulation can be anticipated and accommodated through proper selection of the seal profiles and configurations. In addition, the amount of material injected can be easily controlled to make up for tolerance difficulties and to reduce waste.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A duct assembly for use with a motor vehicle having a mounting surface, the duct assembly comprising:
   an air duct mountable on the mounting surface, the air duct having an inlet opening for receiving pressurized air and a duct portion for channeling pressurized air;
   a first seal disposed on the air duct and circumscribing the inlet opening for inhibiting air leakage at the inlet opening; and
   a second seal disposed on the air duct proximate the duct portion for inhibiting air leakage from the duct portion, the second seal being configured to be disposed between the air duct and the mounting surface when the duct assembly is mounted on the mounting surface;
   wherein the first and second seals are integrally connected and simultaneously formed from a common material.

2. The duct assembly of claim 1 wherein the air duct further has an outlet opening that receives pressurized air from the duct portion.

3. The duct assembly of claim 2 further comprising a third seal disposed on the air duct proximate the outlet opening for inhibiting air leakage from the outlet opening, the third seal being integrally connected to and formed with the first and second seals.

4. The duct assembly of claim 3 wherein the first and third seals have a similar configuration and are connected by the second seal.

5. The duct assembly of claim 1 wherein the first seal is thicker than the second seal.

6. The duct assembly of claim 1 wherein the air duct further has a mating surface configured to engage the mounting surface, the second seal being disposed on the mating surface.

7. The duct assembly of claim 6 wherein the mating surface further has a groove adapted to receive the second seal.

8. The duct assembly of claim 6 wherein the first seal is disposed on the mating surface.

9. A duct assembly for a door of a vehicle, the duct assembly comprising:
   an interior trim panel having inlet and outlet apertures and first and second surfaces, the first surface configured to face toward an interior of the vehicle and the second surface disposed opposite the first surface;
   an air duct attached to the second surface and configured to channel pressurized air between the inlet and outlet apertures; and
   a set of interconnected seals disposed on the air duct for inhibiting air leakage between the air duct and the interior trim panel;
   wherein the set of interconnected seals are integrally formed from a common material and the set of interconnected seals comprises a strip seal and an inlet seal, the inlet seal configured to extend through the inlet aperture and seal against a source of pressurized air when then door is in a closed position.

10. The duct assembly of claim 9 wherein the air duct further comprises an inlet opening, the inlet seal extending through the inlet opening to secure the inlet seal to the air duct.

11. The duct assembly of claim 9 wherein the set of interconnected seals further comprises an outlet seal, the outlet seal configured to extend through the outlet aperture of the interior trim panel and adapted to engage a second air duct when the door is in the closed position.

12. The duct assembly of claim 11 wherein the outlet seal extends through an outlet opening to secure the outlet seal to the air duct.

13. The duct assembly of claim 9 wherein the strip seal is located between an inner edge of the air duct and an outer edge of the air duct.

14. The duct assembly of claim 13 wherein the air duct is attached to the second surface of the interior trim panel along a portion of air duct located between the strip seal and the outer edge.

15. A duct assembly for a vehicle, the duct assembly comprising:
   a trim panel including:
      a first surface configured to face toward an interior of the vehicle;
      a second surface disposed opposite the first surface;
      an inlet aperture extending through the first and second surfaces; and
      an outlet aperture extending through the first and second surfaces; and
   an air duct including:
      a duct portion configured to channel pressurized air between the inlet and outlet apertures;
      a mating surface disposed adjacent to the duct portion, the mating surface including an inlet opening; and
      a seal having a strip seal portion disposed on the mating surface for inhibiting air leakage between the duct portion and the trim panel and an inlet seal portion extending co-axially with the inlet aperture;

wherein the first surface and the air duct cooperate to define a passage for channeling air.

16. The duct assembly of claim 15 wherein the inlet and outlet apertures are in different planes.

17. The duct assembly of claim 15 wherein the air duct further comprises an outlet opening and the seal further comprises an outlet seal portion extending co-axially with the outlet opening.

18. The duct assembly of claim 15 wherein an outer portion of the inlet seal extending from the mating surface is thicker than an inner portion of the inlet seal extending opposite the mating surface.

19. The duct assembly of claim 15 wherein the strip seal portion is disposed in a groove in the mating surface.

* * * * *